United States Patent
Zuo et al.

(10) Patent No.: US 9,890,306 B2
(45) Date of Patent: Feb. 13, 2018

(54) USE OF EPOXY FILM ADHESIVE WITH HIGH INK COMPATIBILITY AND THERMAL OXIDATIVE STABILITY FOR PRINTHEAD INTERSTITIAL BONDING IN IN HIGH DENSITY PRINTHEADS

(71) Applicant: XEROX CORPORATION, Norwalk, CT (US)

(72) Inventors: Yanjia Zuo, Webster, NY (US); Mandakini Kanungo, Penfield, NY (US); Hong Zhao, Webster, NY (US); John R. Andrews, Wilsonville, OR (US); Pratima Gattu Naga Rao, Sherwood, OR (US); Mark A. Cellura, Webster, NY (US); Santokh S. Badesha, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 84 days.

(21) Appl. No.: 14/289,153

(22) Filed: May 28, 2014

(65) Prior Publication Data
US 2015/0344750 A1 Dec. 3, 2015

(51) Int. Cl.
| C09J 163/04 | (2006.01) |
| C09J 163/00 | (2006.01) |
| C09J 7/00 | (2006.01) |
| C09J 7/02 | (2006.01) |
| B32B 27/38 | (2006.01) |
| B32B 27/26 | (2006.01) |
| B32B 27/20 | (2006.01) |

(52) U.S. Cl.
CPC .................................. *C09J 163/00* (2013.01)

(58) Field of Classification Search
None
See application file for complete search history.

(56) References Cited

U.S. PATENT DOCUMENTS

| 6,255,365 B1 * | 7/2001 | Hayakawa | C08G 59/38 257/E23.119 |
| 6,376,053 B1 * | 4/2002 | Nakamura | C08L 63/00 174/259 |
| 2003/0127186 A1 * | 7/2003 | Tominaga | B32B 15/08 156/308.2 |
| 2003/0140485 A1 * | 7/2003 | Yamazaki | C09J 7/02 29/740 |

(Continued)

FOREIGN PATENT DOCUMENTS

| JP | 60-053524 A * | 3/1985 | C08G 59/62 |
| KR | 10-1114359 B1 * | 3/2012 | C09J 7/02 |
| WO | WO 2013/111697 A1 * | 8/2013 | C08L 63/00 |

OTHER PUBLICATIONS

OECD SIDS, "Cyanoguanidine," Nov. 11-14, 2003, 17 pages.*

(Continued)

*Primary Examiner* — Michael J Feely
(74) *Attorney, Agent, or Firm* — MH2 Technology Law Group LLP

(57) ABSTRACT

An adhesive compound can include an uncured epoxy film having a curing temperature between about 80° C. and about 300° C. The uncured epoxy film can include a cresol novolac resin and a bisphenol A epoxy resin. The uncured epoxy film can have a thickness between about 0.1 mil and about 5 mil.

13 Claims, 11 Drawing Sheets

(56) References Cited

U.S. PATENT DOCUMENTS

| | | | |
|---|---|---|---|
| 2004/0009335 A1* | 1/2004 | Kojima | H05K 3/0094 |
| | | | 428/209 |
| 2006/0207720 A1* | 9/2006 | Yoshizawa | C08G 59/3218 |
| | | | 156/325 |
| 2006/0275608 A1* | 12/2006 | Tonapi | C09J 7/00 |
| | | | 428/413 |
| 2007/0254983 A1* | 11/2007 | Lapra | C08K 3/22 |
| | | | 523/200 |
| 2008/0113814 A1* | 5/2008 | Osburn | G07F 17/3239 |
| | | | 463/42 |
| 2010/0015408 A1* | 1/2010 | Fong | B22C 7/02 |
| | | | 428/195.1 |
| 2010/0051190 A1* | 3/2010 | Jerebic | H01L 21/67132 |
| | | | 156/248 |
| 2012/0181703 A1* | 7/2012 | Park | C09J 133/06 |
| | | | 257/774 |
| 2012/0328811 A1* | 12/2012 | Patel | C09D 4/00 |
| | | | 428/36.9 |
| 2013/0115442 A1* | 5/2013 | Sang | C08G 59/4253 |
| | | | 428/327 |
| 2014/0338833 A1* | 11/2014 | Kanungo | B41J 2/1607 |
| | | | 156/281 |
| 2015/0017450 A1* | 1/2015 | Oka | C08G 59/56 |
| | | | 428/418 |
| 2015/0158298 A1* | 6/2015 | Rao | B41J 2/161 |
| | | | 347/71 |
| 2016/0257865 A1* | 9/2016 | Zuo | C09J 163/00 |

OTHER PUBLICATIONS

Machine translation of KR 10-1114359 B1 (no date).*
Abstract of JP 60-053524 A (no date).*
Gerner et al., "Patterned Heater Traces for Injet Printhead", U.S. Appl. No. 13/443,269, filed Apr. 10, 2012.
Yanjia et al., "Processing and Application of Liquid Epoxy Adhesive for Printhead Structures Interstitial Bonding in High Density Piezo Printheads Fabrication", U.S. Appl. No. 13/854,583, filed Apr. 1, 2013.
P. Canale, TechFilm I2300 Material Safety Data Sheet, Aug. 4, 2008, pp. 1-3.
Kanungo et al., "Process for Bonding Interstitial Epoxy Adhesive for Fabrication of Printhead Structures in High Density Printheads," U.S. Appl. No. 13/893,523, filed May 14, 2013.

* cited by examiner

USE OF EPOXY FILM ADHESIVE WITH HIGH INK COMPATIBILITY AND THERMAL OXIDATIVE STABILITY FOR PRINTHEAD INTERSTITIAL BONDING IN IN HIGH DENSITY PRINTHEADS

TECHNICAL FIELD

The present teachings relate to the field of ink jet printing devices and, more particularly, to adhesive materials usable in high density piezoelectric ink jet print heads.

BACKGROUND

Drop on demand ink jet technology is widely used in the printing industry. Printers using drop on demand ink jet technology can use either thermal ink jet technology or piezoelectric technology. Even though they are more expensive to manufacture than thermal ink jets, piezoelectric ink jets are generally favored, for example because they can use a wider variety of inks.

Piezoelectric ink jet print heads include an array of piezoelectric elements (i.e., piezoelectric transducers) made of lead zirconate titanate (PZT). One process to form the array can include detachably bonding a blanket piezoelectric layer to a transfer carrier with an adhesive, and dicing the blanket piezoelectric layer to form a plurality of individual piezoelectric elements. A plurality of dicing saw passes can be used to remove all the piezoelectric material between adjacent piezoelectric elements to provide the correct spacing between each piezoelectric element.

Piezoelectric ink jet print heads can typically further include a flexible diaphragm to which the array of piezoelectric elements is attached. When a voltage is applied to a piezoelectric element, typically through electrical connection with an electrode electrically coupled to a power source, the piezoelectric element bends or deflects, causing the diaphragm to flex which expels a quantity of ink from a chamber through a nozzle. The flexing further draws ink into the chamber from a main ink reservoir through an opening to replace the expelled ink.

The formation of ink jet printheads typically requires lamination of multiple layers of materials as part of their fabrication. Traditional printhead designs may use layers of gold-plated stainless steel sheet metal with features that are photochemically etched and then brazed together to form robust structures. However, with the continued drive to improve cost and performance, use of alternate materials and bonding processes may be used. While polymer layers can be used as a replacement of some sheet metal components, polymers require adhesives with suitable properties to bond to each other and to metal layers.

For example, the adhesive must be chemically compatible with the inks used within the printhead. Further, the adhesive should have certain physical properties that reduce printhead failures during use. An adhesive should have a good bond strength, a low squeeze out to prevent blocking of the fluid path, and should be sufficiently resistant to oxidation with elevated temperatures during use. Also, some adhesives may increase in weight and swell, or become less compliant and more stiff during use when exposed to certain inks and elevated temperatures, which can result in leakage of ink or other failure modes. Some of these failures may occur only after extended use of the printhead.

SUMMARY

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment, an adhesive compound can include an uncured epoxy film having a curing temperature between about 80° C. and about 300° C. The uncured epoxy film can include a cresol novolac resin and a bisphenol A epoxy resin. The uncured epoxy film can have a thickness between about 0.1 mil and about 5 mil.

In another embodiment, there is a method. The method can include forming an epoxy adhesive by curing an adhesive compound. The adhesive compound can include an uncured epoxy film having a thickness between about 0.1 mil and about 5 mil and a curing temperature between about 80° C. and about 300° C. The uncured epoxy film can include a cresol novolac resin and a bisphenol A epoxy resin.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, the word "printer" encompasses any apparatus that performs a print outputting function for any purpose, such as a digital copier, bookmaking machine, facsimile machine, a multi-function machine, electrostatographic device, etc. Unless otherwise specified, the word "polymer" encompasses any one of a broad range of carbon-based compounds formed from long-chain molecules including thermoset polyimides, thermoplastics, resins, polycarbonates, epoxies, and related compounds known to the art.

Achieving reliable adhesion between many different ink jet printhead layers and materials, particularly at the harsh environmental conditions found in current ink jet printhead uses, is a concern for device manufacturers. An embodiment of the present teachings can result in a more robust physical adhesive connection between the various laminated layers within a printhead, particularly with regard to resistance to chemically harsh inks such as acrylate-based ultraviolet (UV) inks and pigmented inks, which can include pigmented aqueous and/or pigmented solid inks, and may result in decreased stresses on the interconnection which electrically couples a piezoelectric transducer to a circuit layer such as a printed circuit board or flexible printed circuit.

Figure 1:
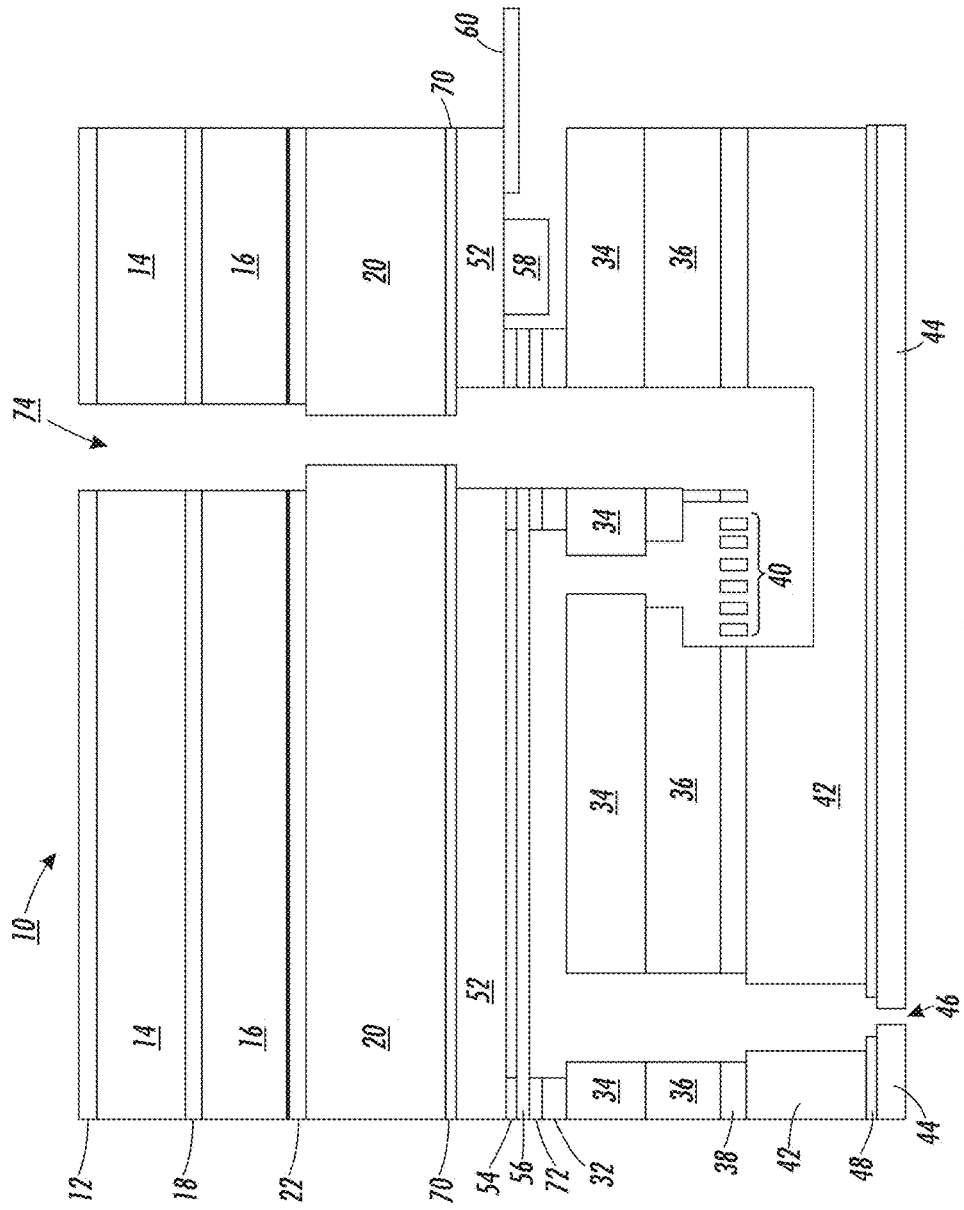
FIG. 1 is a cross section of an exemplary ink jet printhead portion formed in accordance with an embodiment of the present teachings.

Printhead structures are known in the art and include many layers laminated together. The adhesives used for lamination must resist reaction with chemically harsh inks, bond well to surfaces of different materials to prevent rupture during high-pressure printing, and hold up during high temperature printing, for example during printing with solid inks. FIG. 1 depicts a portion of an exemplary ink jet printhead structure 10 that may be formed using an embodiment of the present teachings. The FIG. 1 printhead structure 10 includes a compliant wall 12, an external manifold 14, and a diverter 16 attached to the external manifold 14 with an external manifold adhesive 18. FIG. 1 further depicts a boss plate 20 attached to the diverter 16 with a diverter attach adhesive 22. In an embodiment, the compliant wall 12 can include thermoplastic polyimide, the external manifold 14 can include aluminum, and the boss plate 20 can include stainless steel. The external manifold 14 can receive liquid ink (not individually depicted for simplicity) during use which has been melted from solid ink blocks, a gel ink, a UV ink, or another liquid ink in preparation for printing, and maintain the ink at a print temperature. FIG. 1 further depicts a body 32, a vertical inlet 34, a separator 36, a particulate filter (rock screen) layer 38 including a rock screen 40, a front end manifold 42, and an aperture plate 44 having a nozzle 46. The aperture plate 44 can be attached to the front end manifold 42 with an aperture plate adhesive 48. In an embodiment, the body 32, the separator 36, and the front end manifold 42 can include a metal such as stainless steel, and the vertical inlet 34, the rock screen layer 38, the aperture plate adhesive 48, and the aperture plate 44 can each include one or more polymers. The assembly 10 can be manufactured according to known processing techniques, such as a process including the use of a stack press under high pressure. FIG. 1 further depicts a substrate 52 such as a semiconductor wafer section, glass layer, metal layer, etc., a standoff layer 54, a printhead diaphragm (membrane) 56, a boss plate adhesive 70, a diaphragm adhesive 72, an application specific integrated circuit (ASIC) 58 attached to the semiconductor wafer section, and an interconnect layer 60 such as a flexible (flex) circuit or printed circuit board electrically coupled to the ASIC 58. As discussed above, the substrate 52 can be a silicon, gallium arsenide, metal, glass, etc. Further, the standoff layer 54 can be silicon dioxide and/or SU-8 photoresist. The diaphragm 56 can be a metal such as titanium, nickel, or a metal alloy. The substrate 52 may include a circuit pattern. It will be appreciated that the depiction of the FIG. 1 is a small portion of a printhead depicting a single ink port 74 and nozzle 46, and that other structures may be added or existing structures may be removed or modified. A printhead with current designs may have four ink inlets, one for each color (cyan, magenta, yellow, and black in a CMYK color model, for example), and 7040 nozzles. The structure of FIG. 1 may be formed using an embodiment of the present teachings and may include a structure in accordance with an embodiment the present teachings.

A desirable adhesive for printhead applications would be able to bond any combination of metal layers (e.g., stainless steel, aluminum, etc.) and/or polyimide layers. In selecting an adhesive, similar formulations may have differing properties and operating characteristics. Extensive in-house testing is required to characterize the properties of an adhesive to determine whether it has the necessary characteristics for a specific use. While a supplier may publish some operating characteristics, other unknown characteristics may be of particular interest to a manufacturer searching for a suitable adhesive and thus characterization of the adhesive by the manufacturer is necessary. A large number of adhesive formulations are commercially available and identifying an adhesive that has the necessary characteristics often presents a formidable challenge. Further complicating the selection is the fact that an adhesive may embody different characteristics at different thicknesses, different application processes, and at different temperatures. Additionally, an adhesive may react differently when exposed to different chemicals having similar formulations, for example to similar but different ink formulations. The variety of combinations of epoxy resins and curing agents provides wide latitude in chemical and mechanical properties at the final cured stage.

An embodiment of the present teachings can include the use of an adhesive for physically attaching together two or more printhead parts. In use, the adhesive may be subjected to harsh chemical inks, such as pigmented inks (including pigmented aqueous inks and/or pigmented solid inks) and UV gel inks and to high temperatures and pressures associated with printing, for example, solid inks. In an embodiment, the adhesive may be an epoxy-based adhesive that is formed from an adhesive compound such as a thermal setting polymer. The adhesive compound can be an uncured epoxy film having a thickness in the range of about 0.1 mil to about 5 mil, for example about 0.1 mil to about 2 mil, or for example, about 0.5 mil to about 5 mil. The uncured epoxy film can have a curing temperature of between about 80° C. to about 300° C.

In an embodiment, the adhesive, when properly processed in accordance with an embodiment of the present teachings, may enable the fabrication of a high performance, low cost, high density ink jet printhead. The adhesive is chemically resistant to hostile inks used in current printing applications and maintains adhesion in high-temperature, high-pressure printing conditions.

The uncured epoxy film is a B-stage, two part epoxy. As with many epoxies, the uncured epoxy film can include an epoxy resin and an epoxy curing agent (i.e., hardener) which are mixed together to provide the final adhesive compound. More specifically, the uncured epoxy film can comprise a blend of base components including at least one bisphenol A epoxy resin, such as two bisphenol A epoxy resins, cresol novolac resin, an imidazole amine hardener, and a latent curing agent, dicyandiamide (i.e., "DICY"). The blend of the BisPhenol A Epoxy Resins (DGEBA resins) and the Cresol Novolac Resin coupled with the hardener and latent curing agent can be cured to provide an adhesive with adequate thermo-oxidation resistance, good workability, long pot life, and higher heat resistance than some other adhesives. Additionally, the relatively small amount of the DICY latent curing agent present, e.g., about 2% to 3% by weight, reduces the number of amine linkages in the cured adhesive which are otherwise susceptible to oxidative attack. The combination of resins and curing agent chemistries and ratios provide an adhesive with an extended pot life at room temperature. The uncured epoxy film may also include minimal amount of solvent, such as 2-butoxy ethyl acetate, to provide improved ease of handling of the uncured epoxy film.

The uncured epoxy film can be provided in predetermined geometries. For example, a larger sheet of the uncured epoxy film can be cut via laser ablation into smaller portions to match, for example, the geometries of liners or plates to which the adhesive compound can be adhered to upon curing. In an embodiment, the uncured epoxy film can have a thickness in the range of about 0.1 mil (i.e., 0.0001 inches) and about 5 mil (i.e., 0.005 inches), or between about 0.1 mil and about 4 mil, or between about 0.1 mil and about 2 mil.

A chemical structure of the cresol novolac resin may be:

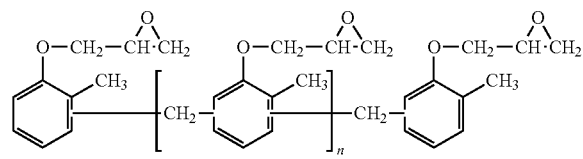

Another chemical structure of the cresol novolac resin may be:

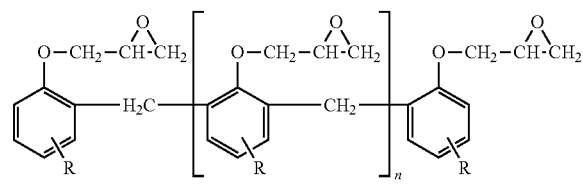

The curing agent used may be DICY, which has the form:

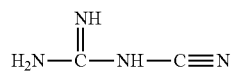

DICY is a representative latent curing agent that forms crystals when processed in accordance with the present teachings. It may be used in the form of a fine powder dispersed within the resin. The material has a very long pot life, for example 6 to 12 months. DICY cures at a high temperature, for example from about 160° C. to about 180° C. in about 20 minutes to about 60 minutes. Cured DICY resins have a good adhesiveness and are less prone to staining that some other resins. DICY may be used in one-part adhesives, powder paints, and pre-impregnated composite fibers (i.e., "pre-pregs").

Another co-curing agent that may be used in the uncured epoxy film is imidazole. Imidazoles are characterized by a relatively long pot life, the ability to form cured resin with a high heat deformation temperature by thermally treating at a medium temperature (80° C. to 120° C.) for a relatively short duration, and the availability of various derivatives having moderate reactivity that improves workability. When used as a co-curing agent with DICY, imidazole may exhibit a better pot life, a faster curing speed, and a higher heat resistance of the cured substance than when an adhesive is used with some other co-curing agents.

Some representative chemical structures of various imidazoles, one or more of which may be included as a co-curing agent, include 1-methylimidazole:

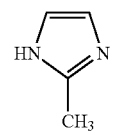

2-ethyl, 4-methyl imidazole:

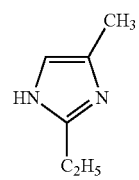

and 1-cyanoethyl-2-undecylimidazolium trimellitate:

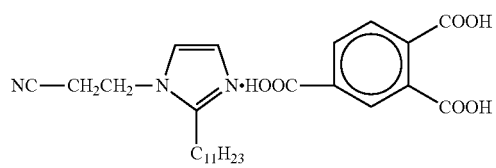

The adhesive compound may be an uncured epoxy film. The uncured epoxy film can be a solid, standalone film. That is, the uncured epoxy film can be transported as a free film without being disposed on a substrate support. However, to prevent multiple ones of the uncured epoxy film from contacting one another, the uncured epoxy film can be transported interposed between a first release liner and a second release liner.

Upon curing the uncured epoxy film to form an adhesive, the adhesive can be used to attach a first substrate to a second substrate. In an embodiment of the present teachings, the release liner is removed to expose a first surface of the uncured epoxy film. The first surface of the uncured epoxy film is contacted to a surface of the first substrate, the second release liner is removed to expose a second surface of the uncured epoxy film. The second surface of the uncured epoxy film is contacted to a surface of the second substrate. The embodiments described below are with reference to a solid uncured epoxy film interposed between a first release liner and a second release liner, although other embodiments are contemplated.

In an embodiment of the present teachings, the uncured epoxy film may be cured for to adhere or bond two surfaces together using a particular process to apply the adhesive. The process may result in the adhesive having various desirable operating characteristics or properties for a printhead fabrication application that are not found if a different application process is used. A novel fabrication process has been developed to enable the use of epoxy adhesive formed by curing a standalone, uncured epoxy film, for printhead interstitial bonding with little or no squeeze out, for example, as compared to a liquid epoxy-based adhesive, at high pressure and good bonding strength with little or no formation of trapped air bubbles.

The procedure for attaching two or more surfaces together by curing the adhesive compound described above may include an embodiment of the following process. While the process is described with reference to the attachment of a polyimide film as a first substrate and a stainless steel sheet as a second substrate by curing a standalone uncured epoxy film for simplicity of description, it will be understood that the uncured epoxy film may be cured to form adhesive that can attach other substrates together, for example various metals, polyimide layers, polymers other than polyimide, and combinations thereof.

In an embodiment, the substrate surfaces that are to be bonded are prepared using a surface preparation process. The composition of the substrate material will depend on the application and may include metals such as stainless steel or aluminum, or polymers such as polyimides. The surface preparation can include cleaning the first and second substrates using a solvent such as isopropyl alcohol (isopropanol, IPA) to remove trace contaminating substances such as oils and airborne particulates.

After cleaning the bonding surfaces of the substrate material with a solvent, the surface preparation may also include subjecting the bonding surfaces to a plasma cleaning process. In an embodiment, the plasma cleaning process may include an oxygen plasma cleaning process for a duration of from about 2 minutes to about 10 minutes. The plasma cleaning process is used to further remove any contaminants from the bonding surfaces and also to roughen the substrate to increase the bonding surface area for improved adhesion.

After surface preparation, the uncured epoxy film and first substrate are prepared for tacking with the uncured epoxy film. In an embodiment, the first release liner is removed from the first surface of the solid uncured epoxy film. At least the bonding surface of the first substrate is heated to a tacking temperature of between about 40° C. and about 120° C., or between about 50° C. and about 100° C., or between about 50° C. and about 60° C. This heating may be performed, for example, by heating the first substrate on a hot plate or within an oven. The entire first substrate may be heated, or only the bonding surface may be heated. After heating the bonding surface of the first substrate, the first surface of the solid uncured epoxy film is contacted with the bonding surface of the first substrate, for example by placing the first surface of the uncured epoxy film onto the bonding surface to tack the first substrate to the uncured epoxy film, thereby forming a first substrate-uncured epoxy film assembly.

At the tacking temperature, the first substrate-adhesive assembly is rolled by moving a roller under pressure across either the exposed second release liner on the second surface of the uncured epoxy film, across a second surface (back side) of the first substrate, or both. This rolling stage assists in removing air bubbles at the interface between the first surface of the adhesive and the bonding surface of the first substrate. In an embodiment, the roller may be rolled across the first substrate-uncured epoxy film assembly at a pressure, for example at a roller pressure of between about 1 psi and about 10 psi, or between about 1 psi and about 5 psi, against the surface.

After this processing stage, the first substrate-uncured epoxy film assembly is cooled to ambient temperature of 22° C. or less to result in the first substrate being tacked to the uncured epoxy film. This tack procedure serves to wet the uncured epoxy film onto the substrate to reduce or eliminate air bubbles.

Subsequently, the second release liner is removed from the second surface of the solid uncured epoxy film. At least the bonding surface of the second substrate is heated to the tacking temperature as described above for the first substrate, between about 40° C. and about 120° C., or between about 50° C. and about 100° C., or between about 50° C. and about 60° C. for a duration of between about 1 minute and about 5 minutes. This heating may be performed, for example, by heating the second substrate on a hot plate or within an oven. The entire second substrate may be heated, or only the bonding surface may be heated. After heating the bonding surface of the second substrate, the second surface of the solid uncured epoxy film is contacted with the bonding surface of the second substrate, for example by placing the second surface of the uncured epoxy film onto the bonding surface to tack the second substrate to the uncured epoxy film, thereby forming a second substrate-uncured epoxy film assembly.

At the tacking temperature, the second substrate-uncured epoxy film assembly is rolled by moving a roller under pressure across the back of the second substrate to assist in the removal of bubbles at the interface between the second surface of the uncured epoxy film and the bonding surface of the second substrate. In an embodiment, the roller may be rolled across the second substrate-uncured epoxy film assembly at a pressure, for example at a roller pressure of between about 1 psi and about 10 psi, or between about 1 psi and about 5 psi, against the surface. After rolling the second substrate-uncured epoxy film assembly, first and second substrates are partially adhered together using the tacky uncured epoxy film, thereby forming a three layer assembly. The three layer assembly, including the first and second substrates and the uncured epoxy film, may be cooled to ambient temperature, or may proceed directly to the next processing stage without cooling, for example by ramping the temperature to a partial curing temperature as described below. For example, because the uncured epoxy film has a curing temperature in the range of between about 80° C. and about 300° C., or between about 90° C. and about 200° C., or between about 120° C. to about 190° C., the uncured epoxy film can be partially or fully cured depending on temperature to which the uncured epoxy film is heated. While the process is described with reference to a three layer assembly, the three layer assembly may include additional substrates attached to the three layer assembly, for example using other layers of uncured epoxy film or other portions of the existing uncured epoxy film.

After rolling the second substrate-adhesive assembly to form the three layer assembly, an adhesive partial curing process is performed. The three layer assembly may be heated to a partial curing temperature of between about 80° C. and about 140° C., or between about 90° C. and about 120° C., or between about 100° C. and about 120° C., for example about 120° C. The three layer assembly may be heated, for example, on a hot plate or in an oven. Once the three layer assembly reaches the partial curing temperature, heat is applied to the three layer assembly for a duration of between about 10 minutes and about 20 minutes, for example about 15 minutes. This partial curing process is a crucial stage to decrease, minimize, or eliminate squeeze out of the adhesive compound during subsequent processing. If a temperature and/or duration of this partial curing stage is insufficient or excessive, adhesive compound squeeze-out, over-curing of the adhesive compound, or damage to the adhesive compound components may occur.

After the partial curing process, the three layer assembly is heated under pressure, for example in a jet stack press, to a final bonding temperature to complete the bonding process to polymerize the adhesive compound (i.e., the uncured epoxy film) and thereby form a fully cured adhesive. In an embodiment, the assembly is heated to a final bonding temperature of between about 100° C. and about 300° C., or between about 150° C. and about 200° C., or between about 180° C. and about 200° C., for example about 190° C. Once the three layer assembly reaches the final bonding temperature, heat is applied to the three layer assembly for a duration of between about 20 minutes and about 200 minutes, or between about 60 minutes and about 100 minutes, for example about 70 minutes. During the application of the final bonding temperature, a bonding pressure of between about 40 psi and about 100 psi, or at a pressure of 70 psi or less, or at a maximum pressure of 70 psi, for example a pressure of about 55 psi, is applied to the three layer assembly within the jet stack press. After curing the adhesive compound at the final bonding temperature under the bonding pressure for the above-stated duration, the pressure and temperature are decreased to ambient levels to complete the bonding process. For purposes of this disclosure, a "fully cured" adhesive compound refers to an adhesive that is sufficiently cured (i.e., polymerized and crosslinked) for use of the printhead (e.g., more than 95% cured). A curing agent such as DICY and/or a co-curing agent such as imidazole, which may or may not be present in the uncured epoxy film, may or may not remain in the fully cured adhesive depending, for example, on whether the fully cured adhesive is 100% cured. In an embodiment, depending on a ratio of epoxy to curing agent in the pre-cured formulation (i.e., the uncured epoxy film), the curing agent such as DICY may remain in the matrix after curing even if the adhesive is 100% cured.

In an embodiment, epoxy adhesive formed by curing the adhesive compound (i.e, curing the uncured epoxy film) may be used, referring to FIG. 1, as the external manifold adhesive 18, the diverter attach adhesive 22, the aperture plate adhesive 48, the boss plate adhesive 70, the diaphragm adhesive 72, or generally any printhead adhesive. The epoxy adhesive may be used to physically attach any combination of one or more metals (e.g., stainless steel, aluminum, copper, metal alloy, etc.), one or more semiconductors (e.g., silicon, gallium arsenide, etc.), and/or one or more organic or inorganic polymers (e.g., polyimide, nylon, silicone, etc.).

During testing, it was found that a cured epoxy adhesive compound prepared according one or more of the process embodiments described above demonstrated characteristics and properties well suited for printhead applications. In one test, nozzles were drilled into an adhesive sample including the cured adhesive compound prepared according to an embodiment described above and evaluated for bubbles. No bubbles greater than 20 µm were detected using this process.

Wicking or squeeze out of adhesive occurs when the cured adhesive compound has a change in dimension of 5% or greater, which can lead to leakage of ink or bursting of the printhead during high-pressure printing. For example, pressures within a solid ink jet printhead can reach up to 10 psi. The subject material demonstrated a squeeze out of less than 5%. A squeeze out test was performed on an assembly including adhesive formed by curing the uncured epoxy film wherein the adhesive is interposed between a stainless steel layer and a polyimide layer with 500 µm nozzles processed according to an embodiment described above. The completed adhesive had a thickness of about 1 mil. All of the nozzles were open subsequent to final bonding in a jet stack press. A different printhead adhesive prepared using the same process failed to perform satisfactorily with complete blockage of the nozzles. Additionally, the same adhesive without the partial curing stage failed.

To provide sufficient bonding of metal to metal, metal to polyimide, or polyimide to polyimide, an adhesive must provide a lap shear strength, regardless of the material, of greater than about 200 psi. Some adhesives minimally meet this tolerance, do not meet this tolerance, or meet the tolerance only at room temperatures. In a lap shear sample preparation, the stainless steel adherends were cleaned for five minutes in an ultrasonic bath of IPA, then another four minutes of detergent ultrasonic cleaning, followed by a five minutes of a rinse in deionized water, followed by oven drying at 100° C. for 30 minutes, then a plasma clean. The adhesive formed by curing the uncured epoxy film was bonded between the adherends as described above at a thickness of 1.0 mil. For an area of 0.62 in$^2$, a maximum load was found to be 1627.2 pound-force (lbf), and the lap shear strength was found to be greater than 2600 psi (2625 psi) bonding a first substrate to a second substrate. The material prepared according to the method described above thus demonstrated good bonding strength for printhead applications.

Additionally, weight gain (i.e., mass uptake) of an adhesive during exposure to harsh inks results in swelling, which can cause leakage or bursting of the printhead during high-temperature, high-pressure use. In an embodiment of the present teachings, when exposed to gel UV ink, the cured epoxy adhesive resisted weight gain and swelling (i.e., less than 0.4% weight gain) when exposed to harsh inks at 90° C. continuously for 20 weeks and is thus compatible with harsh inks. In contrast, some conventional inks used in printhead fabrication show marked weight change when exposed to harsh inks, in some cases a percent change in weight of as much as 160% after less than 1000 hours of testing.

While some epoxy adhesives are cured using high pressures, for example pressures greater than 200 psi, the subject material may be cured at pressures of 200 psi or less, for example about 55 psi. Extreme pressures are avoided where possible during printhead manufacture, as various printhead structures such as piezoelectric elements and electrical circuits may be damaged during high pressure assembly processes. Still, high pressures are used in conventional processes with some conventional adhesives to improve adhesive bonding and printhead reliability.

After forming a laminated printhead structure such as the structure of FIG. 1 using an adhesive formed by curing the uncured epoxy film, the printhead is filled with an ink 206 (FIG. 2), for example a UV ink or a pigmented ink. These inks are particularly chemically reactive with conventional epoxy adhesives applied using conventional techniques, which are exposed to the ink within the printhead. In an embodiment, the adhesive of the embodiments, such as the adhesive formed by curing the uncured epoxy film described herein, resists chemical reaction with the ink, for example weight gain and swelling (mass uptake).

Additionally, in an embodiment, a storage modulus of the epoxy adhesive formed by curing the uncured epoxy film of the embodiments is between about 100 megapascals (MPa) and about 3000 MPa at a temperature of 20° C. and between about 3 MPa and about 1500 MPa at a temperature of 120° C. An embodiment of the adhesive formed by curing the uncured epoxy film may further have a shelf life of greater than one month at 20° C. and greater than one year at 0° C.

To reduce ink leakage between adjacent layers, a particle size of a filler material within an adhesive should be as small as possible. Fillers within the subject material may include a plurality of particles, wherein a maximum diameter (or a maximum dimension in any direction) of each of the plurality of particles is 1.0 µm or less. Filler materials may include one or more of calcium carbonate, silica, alumina, alumina trihydrate, barium sulfate, titania, and kaolin clay.

Figure 2:
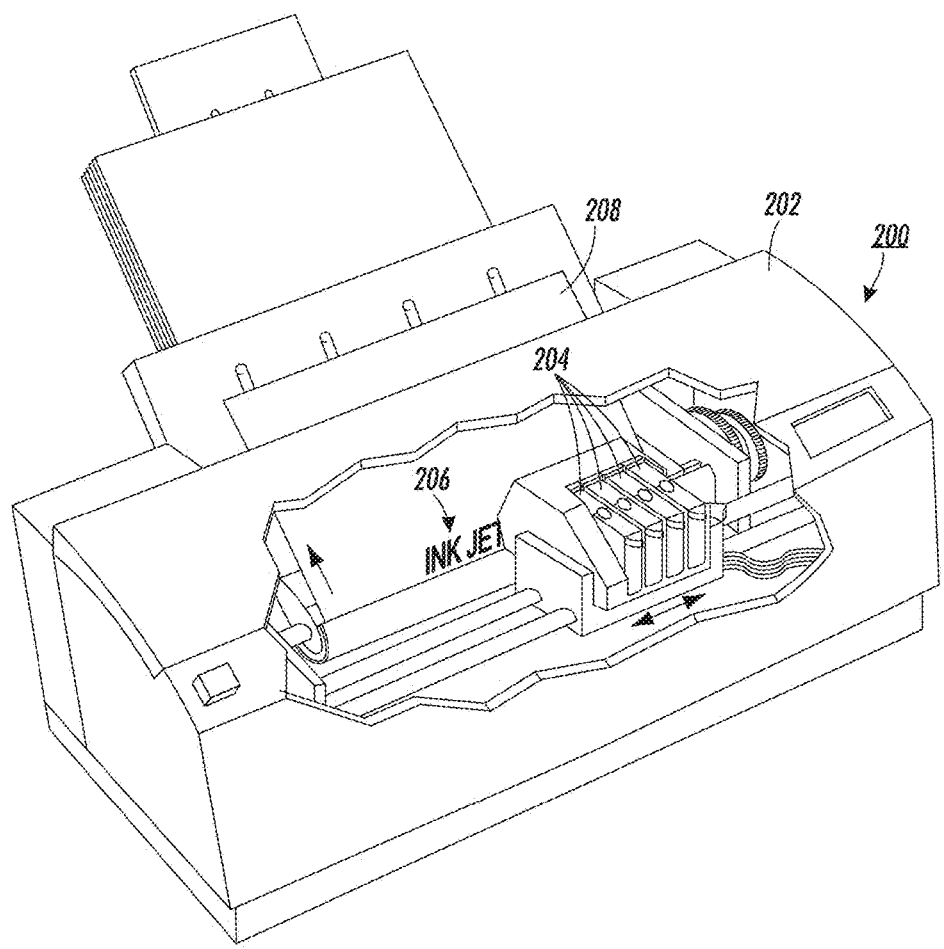
FIG. 2 a perspective view of a printer including one or more printheads in accordance with an embodiment of the present teachings.

FIG. 2 depicts a printer 200 including a printer housing 202 into which at least one printhead 204 including an embodiment of the present teachings has been installed and that encases the printhead 204. During operation, ink 206 is ejected from one or more printheads 204. The printhead 204 is operated in accordance with digital instructions to create a desired image on a print medium 208 such as a paper sheet, plastic, etc. The printhead 204 may move back and forth relative to the print medium 208 in a scanning motion to generate the printed image swath by swath. Alternately, the printhead 204 may be held fixed and the print medium 208 moved relative to it, creating an image as wide as the printhead 204 in a single pass. The printhead 204 can be narrower than, or as wide as, the print medium 208. In another embodiment, the printhead 204 can print to an intermediate surface such as a rotating drum or belt (not depicted for simplicity) for subsequent transfer to a print medium.

EXAMPLES

Example 1—Production of Uncured Epoxy Adhesive Film

The uncured epoxy film, which can be a B-stage epoxy film, can include formulation comprising BPA epoxy resin, Novolac resin, latent agent and other components. The B-stage epoxy film is created by blending solid resins in a solvent carrier, preparing a homogeneous liquid slurry that can be coated on a surface. Most of the excess solvent is then evaporated at a temperature below the curing temperature. This process creates a stable solid in the desired configuration, which can then be cured at a later time with exposure to heat. An advantage of this approach is that the quenching process for stopping curing is avoided, thus eliminating a step with high variability. The B stage film created is a solid form uncured epoxy. It has a minimum amount of residual solvent for handling purposes and silica fillers for mechanical strength and film formation.

Example 2—Curing of the Uncured Epoxy Adhesive Film

Figure 3:
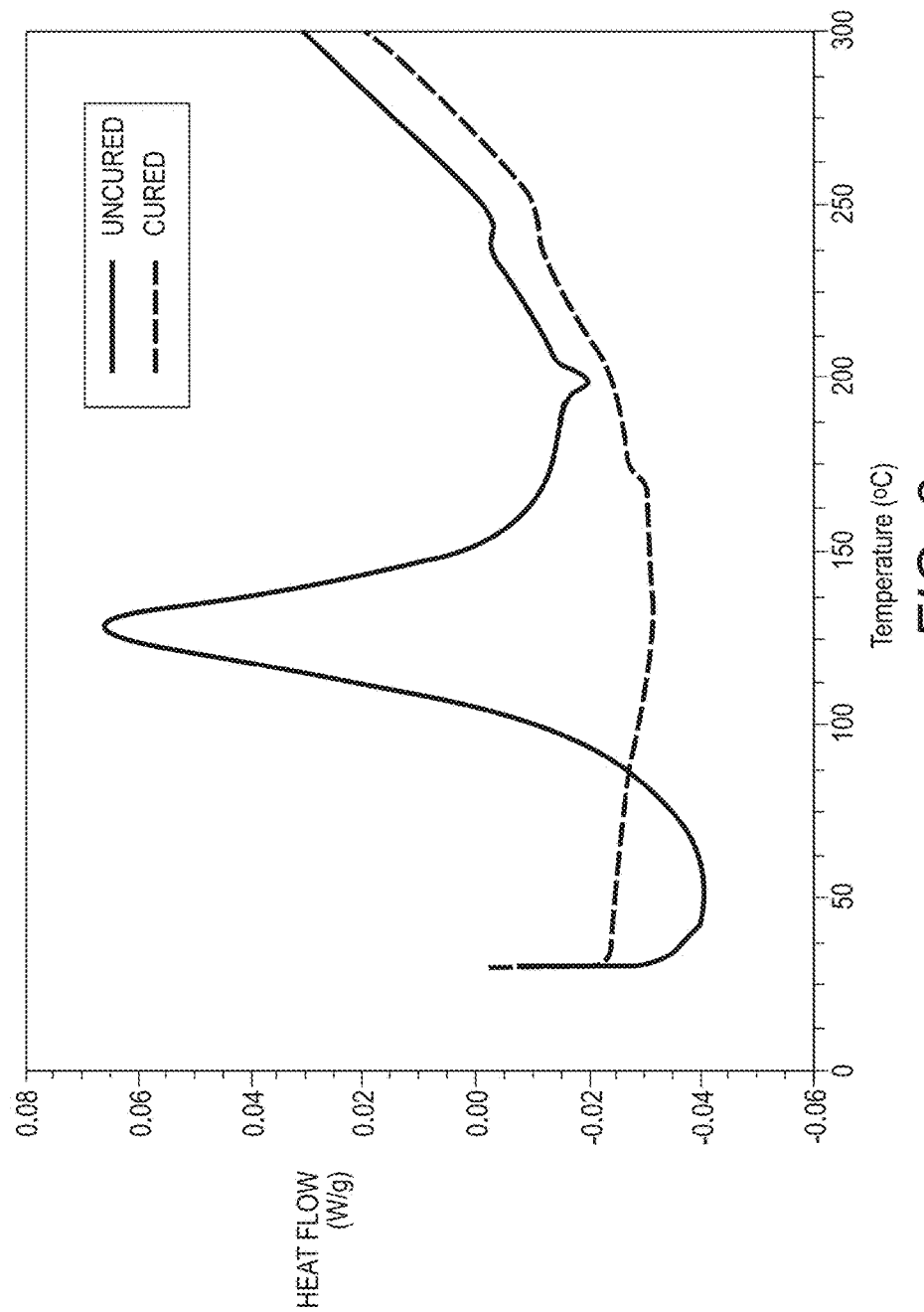
FIG. 3 is a differential scanning calorimetry (DSC) graph of heat flow (W/g) versus temperature (° C.) for uncured adhesive film and cured adhesive film of embodiments.
Figure 4:
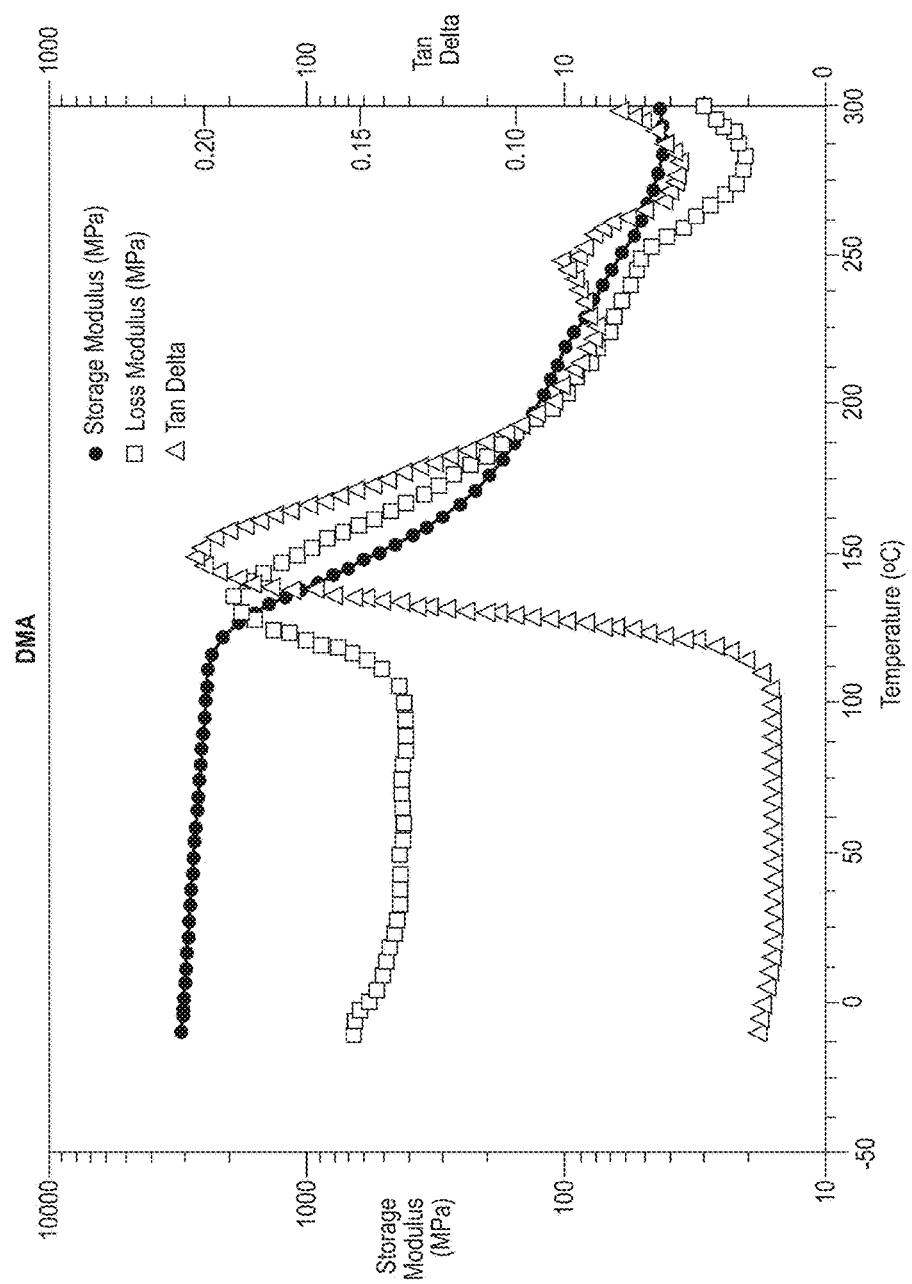
FIG. 4 is a graph of storage modulus (MPa) and loss modulus (MPa) versus temperature (° C.) for adhesive film of embodiments cured at 190° C. for 70 minutes, and includes tan(δ) (Tan Delta) versus temperature (° C.) showing a Tg of 149° C. for cured adhesive film.

The uncured epoxy film was cured at 190° C. for 70 min. Differential scanning calorimetry (DSC) results shown in FIG. 3 confirms that the uncured epoxy film was fully cured. Dynamic Mechanical Analysis (DMA) was conducted to evaluate the physical properties of the final cured epoxy adhesive and data is presented in FIG. 4. The Tg of the epoxy adhesive (i.e., the cured epoxy film) is 149° C., which is higher than that of a printhead operating temperature (about 40° C. for aqueous ink, 85° C. for UV gel ink, and 115° C. for solid inks).

Example 3—UV Ink Compatibility Testing

Excellent ink compatibility of adhesive formed by curing the uncured epoxy film was demonstrated by the ink soaking tests. The uncured epoxy film was cured at 190° C. for 70 min and then put into various ink soaking environments with results of ink soaking tests shown in FIG. 5. LancE ink and Pigmented Black are solid inks. SunJet UV is commercially available UV ink. HP latex ink and Collins dye based ink were chosen as representative commercially available aqueous inks.

Figure 5:
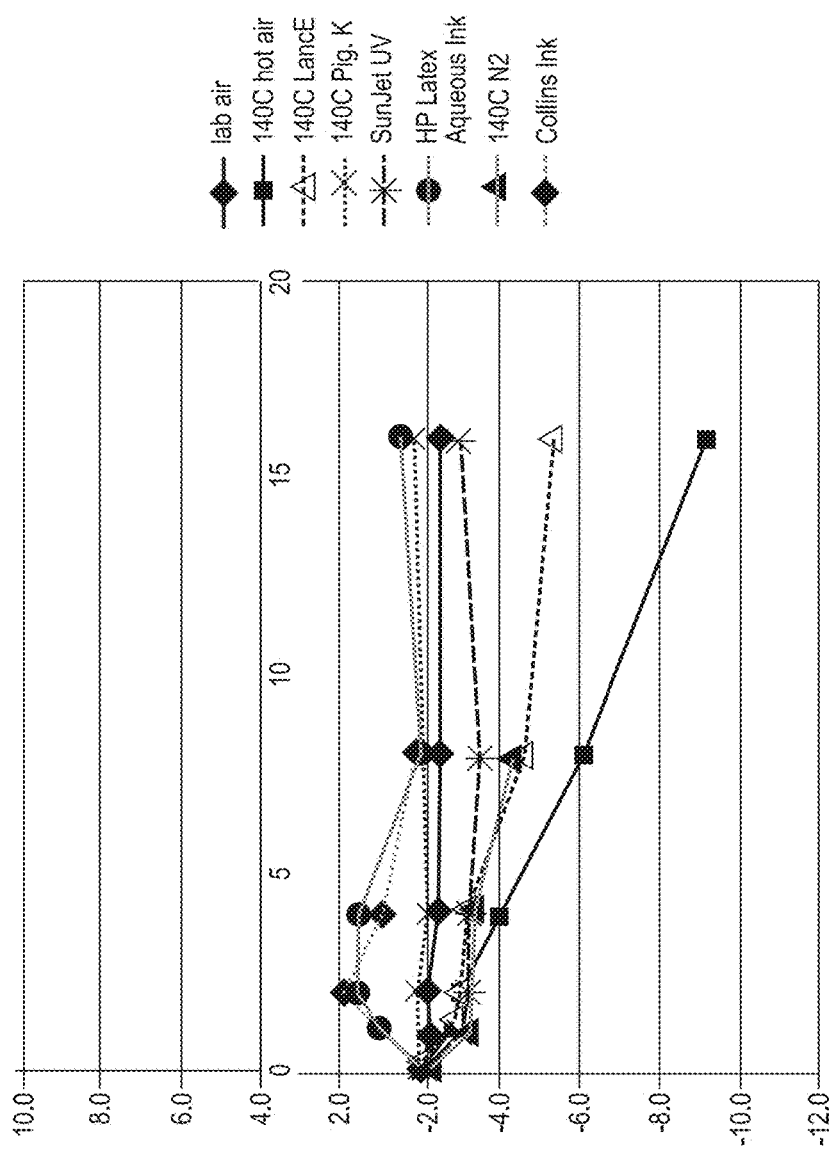
FIG. 5 is a graph of the percent weight change in a cured adhesive film (cured at 190° C. for 70 minutes) of embodiments soaked in lab air (ambient), hot air (140° C.), LancE ink (commercial solid ink), pigment K (pigmented black solid ink), commercial UV ink (e.g., Sunjet UV ink), HP latex ink (commercial aqueous ink), hot nitrogen (140° C.) or Collins ink (commercial aqueous ink) versus time (weeks).
Figure 6A:
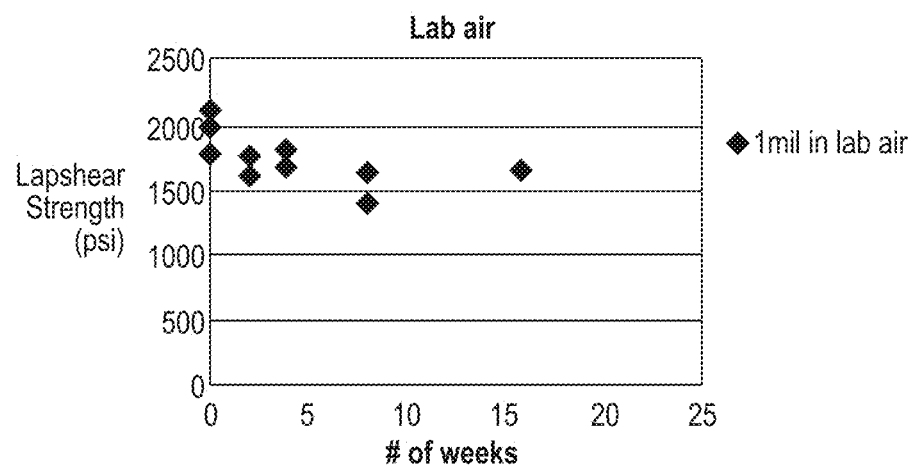
FIGS. 6A-6H are graphs of lap shear aging results of lap shear coupons using stainless steel adherends with adhesive films of embodiments in the soaking environments described for FIG. 5. The graphs show lap shear strength (psi) versus aging duration in weeks.
Figure 6B:
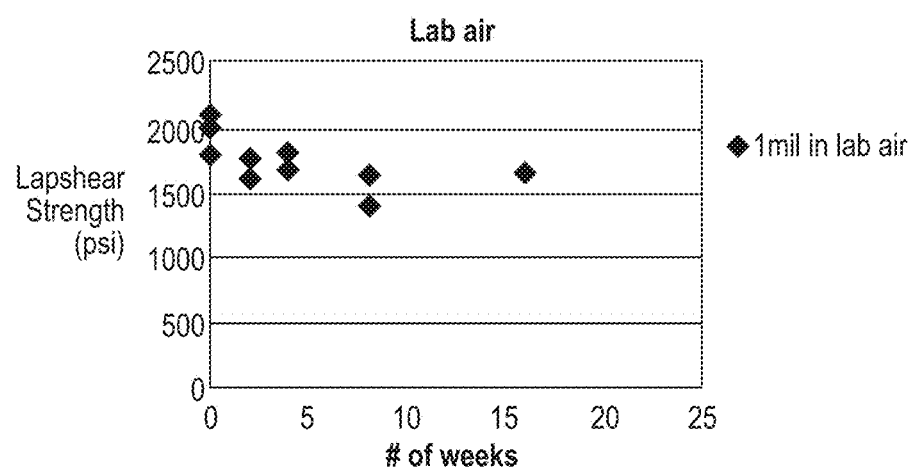
Figure 6C:
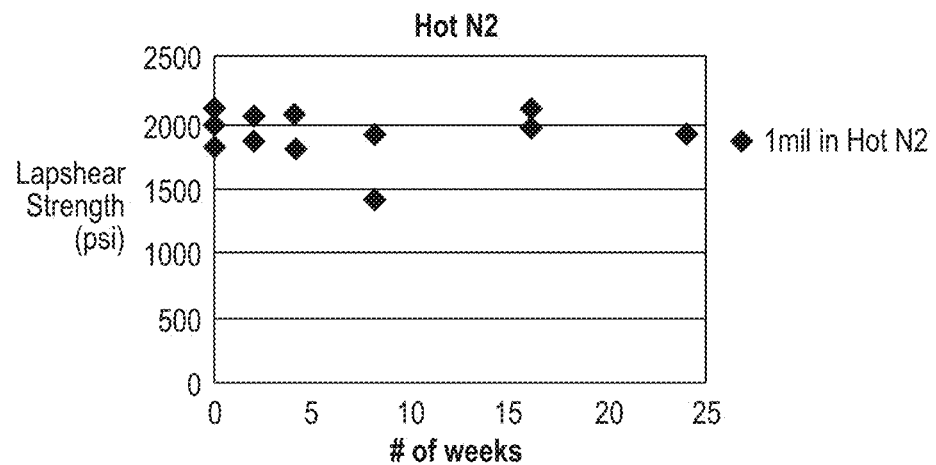
Figure 6D:
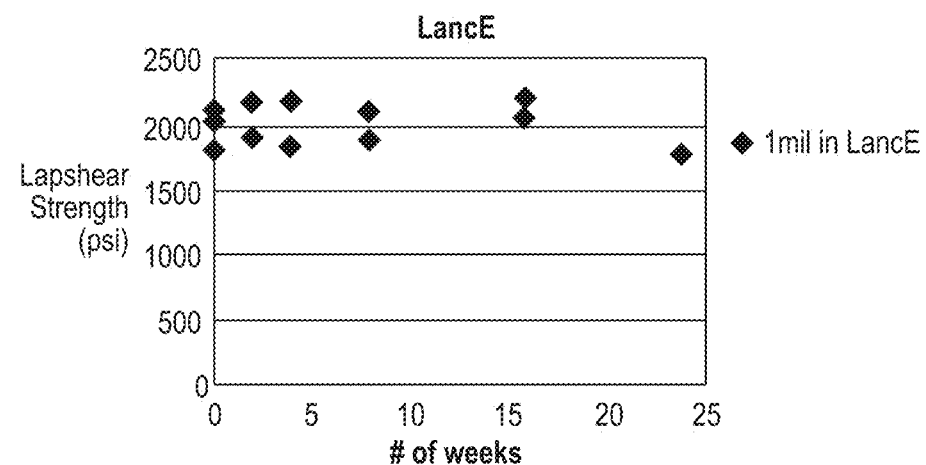
Figure 6E:
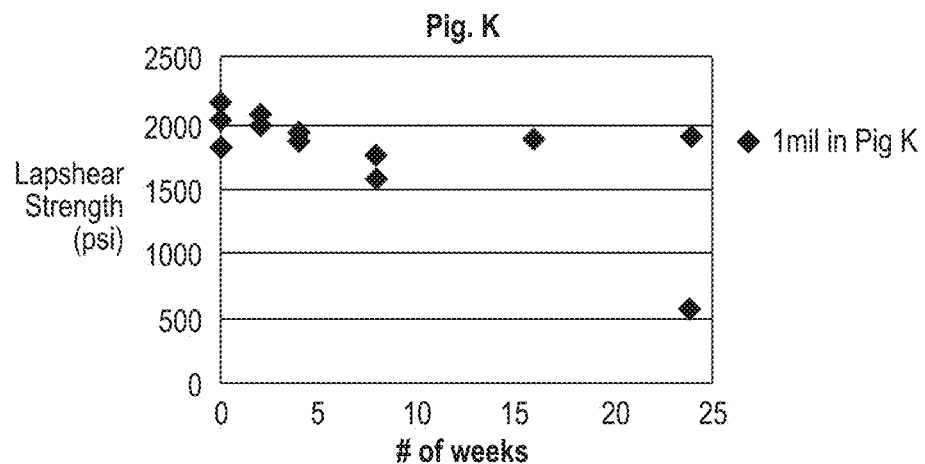
Figure 6F:
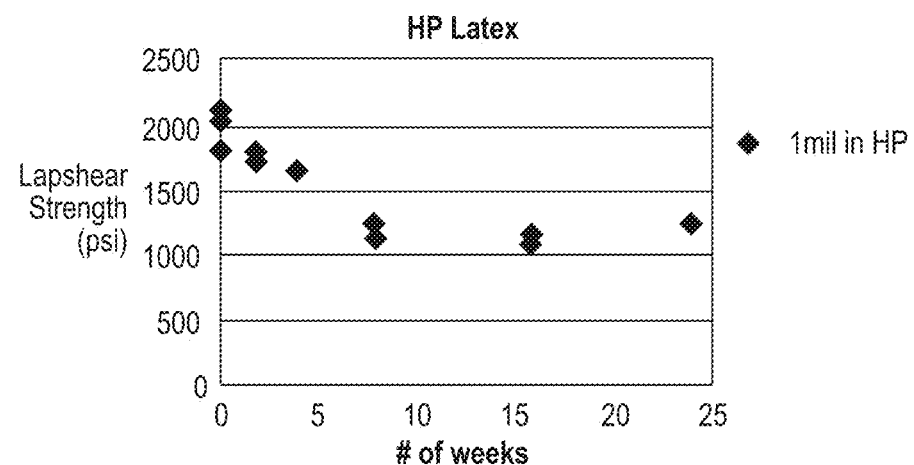
Figure 6G:
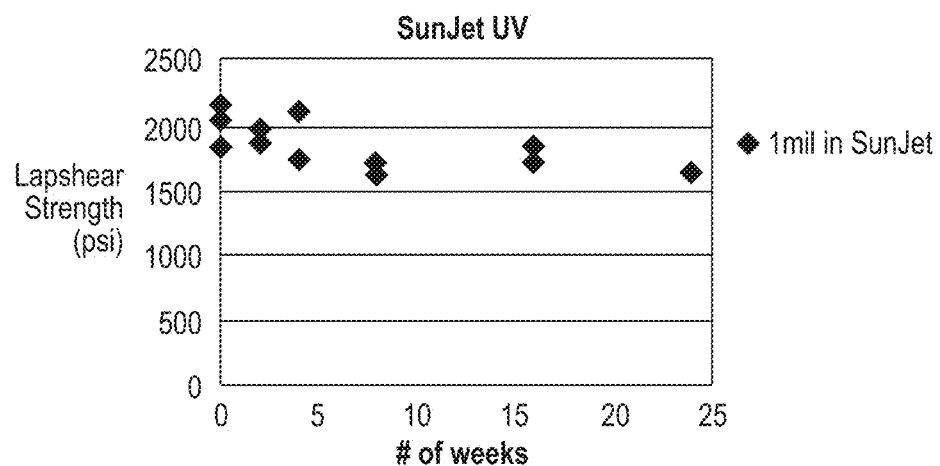
Figure 6H:
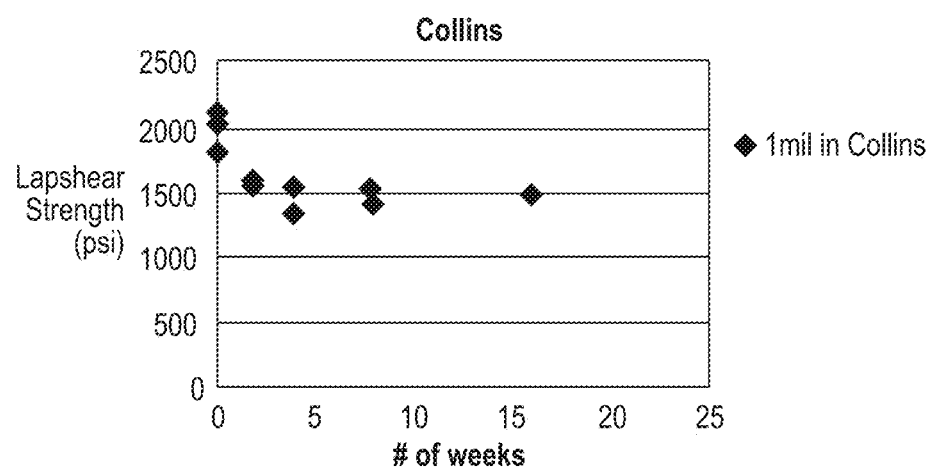

As shown in the ink soaking test data shown in FIG. 5, the weight changes in Lab air, Hot Nitrogen, Pigmented Black, Sunjet UV ink, HP latex ink and Collins ink are all within +/−2% for up to 16 weeks. While not limited to any particular theory, it is believed that weight losses observed in LancE ink and Hot air are likely to be minor oxidation effects from side groups breakage within the polymer network.

Other commercially available adhesives products were evaluated for compatibility with UV inks. See Table 1 below. The cured adhesives were soaked in Xerox UV gel inks. The adhesives were incompatible with the UV gel inks in terms of weight gain or dissolution upon exposure to the UV gel ink.

TABLE 1

| Adhesive Type | Commercial Product | Percent Weight Gain (Test Duration) |
|---|---|---|
| Poly amide-imide | KS 6600 (Hitachi) | 28% (14 weeks) |
| Nitrile phenolic based | TDS 668 (3M) | Dissolved |
| Epoxy-acrylic based | UV 1051 (3M) | 68% (1 week) |
| Modified acrylic | Pyralux FR0100 (DuPont) | 68% (2 weeks) |

Example 4—Functional Testing of Uncured Epoxy Film

Example 4a: Lap Shear Evaluation

Lap shear coupons were prepared using stainless steel adherends to evaluate the bonding strength of the adhesive formed by curing the uncured epoxy film. Long term aging test were initiated in various ink soaking environments. In a typical lap shear sample preparation, the stainless steel adherends were cleaned for 5 minutes in an ultrasonic bath of IPA followed by 4 minutes of detergent ultrasonic cleaning and 5 minutes of a DI water rinse. The parts were oven-dried for 30 min/100° C. and then plasma cleaned. Then the adhesive was bonded between the two stainless steel adherends using the same tacking and bonding procedure described above.

FIGS. 6A-6H show results of the lap shear aging results in various soaking environments. Data were all collected at elevated temperature of 115° C. It can be seen from FIGS. 6A-6H, that bond strengths in Lab air, Hot air, Hot Nitrogen, LancE ink, Pigmented Black and Sunjet UV are very stable for up to 24 weeks. In HP latex ink, there are notable decreases in shear strength within 8 weeks aging, however, beyond that, ~1200 psi bond strength was well maintained for up to 24 weeks. In Collins dye based ink, initial decreases in shear strength were observed within 4 weeks of aging, while no further decreases were observed by up to 16 weeks aging and ~1500 psi bond strength was well kept. Overall, adhesive formed by curing the uncured epoxy film has much higher bond strength than 200 psi. Additionally, over the aging process and in all the different inks, high bond strengths were well maintained, indicating that adhesive formed by curing the uncured epoxy film has very good bonding performance in various inks.

Example 4b: Materials Burst Test Structure

Figure 7A:
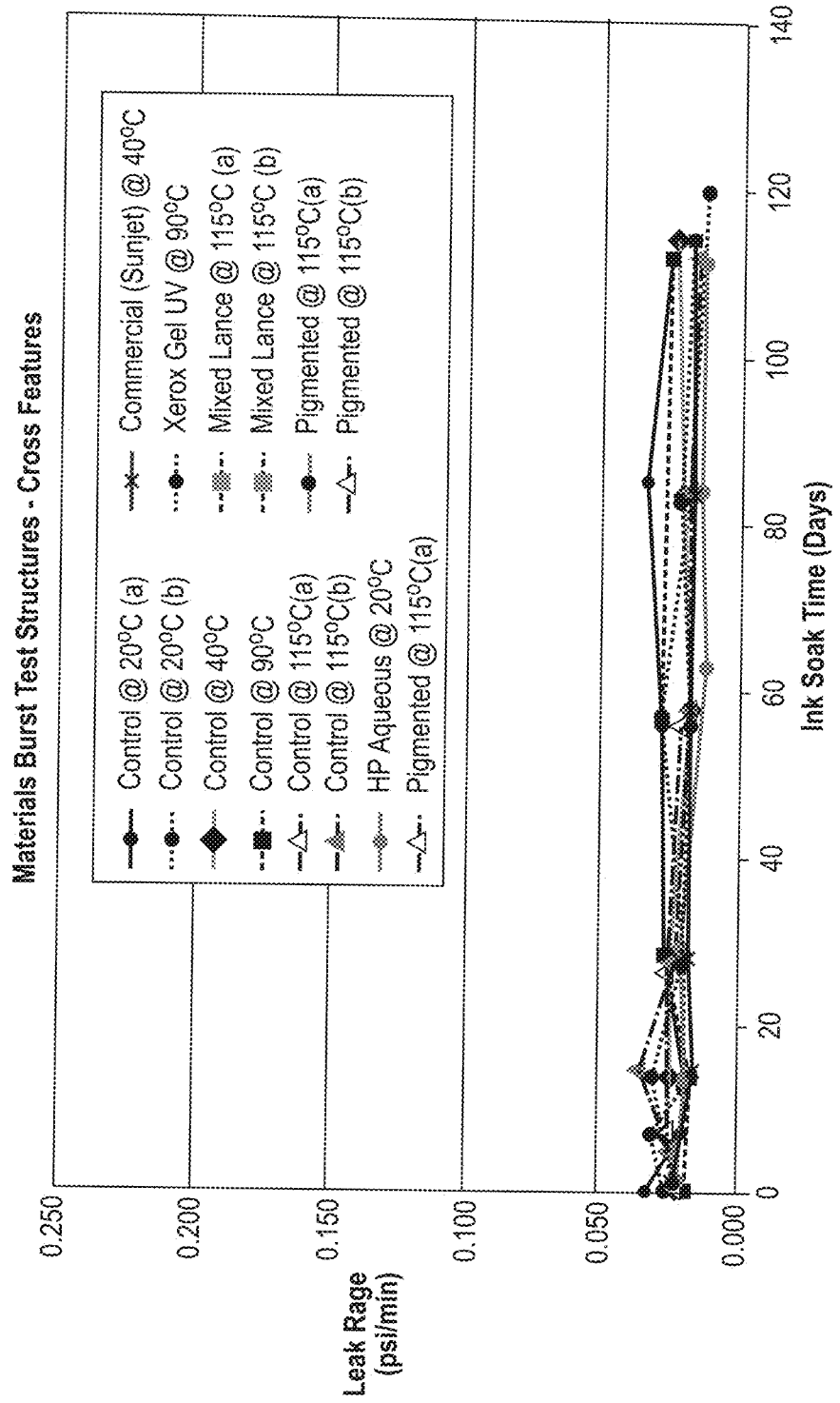
FIGS. 7A-7B are graphs showing results for burst testing of cured adhesive film of embodiments built into materials burst test structures (MTS) in coarse (FIG. 7A) and fine (FIG. 7B) features and soaked in several aging environments, including various inks.
Figure 7B:
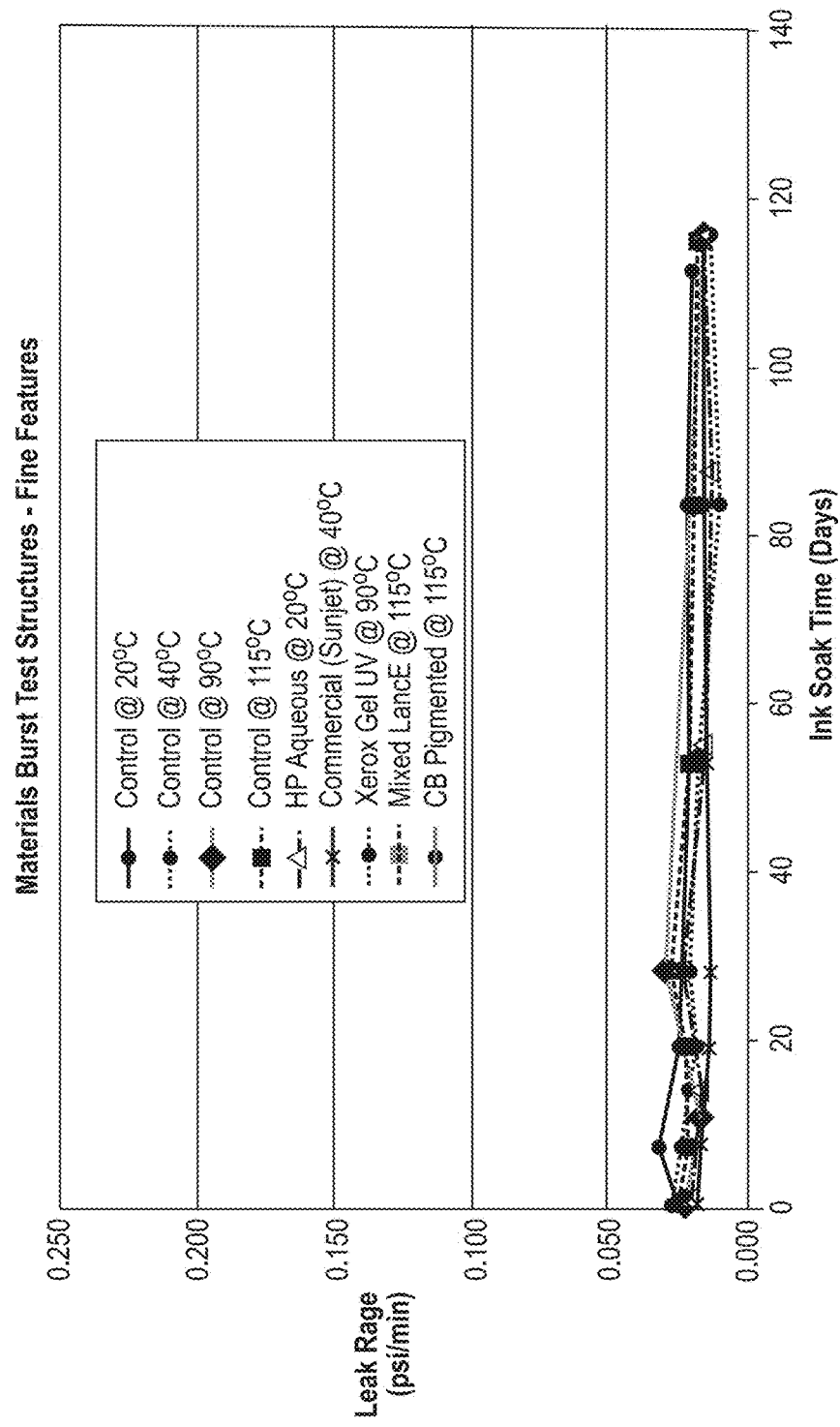

Adhesive formed by curing the epoxy film was disposed in materials burst test structure (MTS) testing; a functional testing to monitor the leaks in the bonding interfaces. The prepared MTS in both coarse and fine features were soaked into several aging environments, including various inks. As shown in FIGS. 7A-7B, no failure was observed in any of the aging environments in more than 110 days.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method of bonding, comprising:
providing a solid film of a B-stage uncured epoxy resin composition, the solid film having a thickness from about 0.1 mil to about 5 mil and a curing temperature from about 80° C. to about 300° C.;
disposing the solid film between a first release liner and a second release liner;
removing the first release liner to expose a first surface of the solid film;
heating a first substrate to a tacking temperature of from about 40° C. to about 120° C.;
contacting the first surface of the solid film to a heated surface of the first substrate thereby forming an intermediate assembly;
cooling the intermediate assembly to ambient temperature;
removing the second release liner to expose a second surface of the solid film;
heating a second substrate to a tacking temperature of from about 40° C. to about 120° C.;
contacting the second surface of the solid film to a heated surface of the second substrate, thereby forming a three layer assembly of the first substrate, the solid film, and the second substrate;
optionally cooling the three layer assembly to ambient temperature; and
heating the three layer assembly to at least partially cure the solid film;
wherein the B-stage uncured epoxy resin composition comprises a blend of: a cresol novolac epoxy resin, two bisphenol A epoxy resins, a hardener, and a filler material;
wherein the hardener consists of: dicyandiamide latent curing agent in the form of a fine powder, 1-methylimidazole co-curing agent, 2-ethyl,4-methyl imidazole co-curing agent, and 1-cyanoethyl-2-undecylimidazolium trimellitate co-curing agent; wherein the dicyandiamide latent curing agent is provided in an amount of about 2% to about 3% by weight of the overall composition and has the following chemical structure:

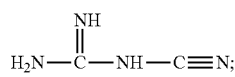

wherein the filler material comprises a plurality of particles comprising one or more of barium sulfate, alumina trihydrate, silica, alumina, calcium carbonate, titania, and kaolin clay; and wherein each of said particles has a maximum dimension in any direction of 1.0 µm or less.

2. The method of claim 1, wherein the solid film has a thickness from about 0.1 mil to about 2 mil.

3. The method of claim 1, wherein the cured solid film has a storage modulus of from about 100 megapascals (MPa) to about 1500 MPa at a temperature of 20° C. and from about 3 MPa to about 700 MPa at a temperature of 120° C.

4. The method of claim 1, wherein the solid film has a shelf life of greater than one month at 20° C. and greater than one year at 0° C.

5. The method of claim 1, wherein the solid film is capable of being transported as a standalone film without being disposed on a substrate support.

6. The method of claim 1, further comprising cutting the solid film via laser ablation into a plurality of portions that each match a geometry of a liner or a plate of a printhead structure.

7. The method of claim 1, wherein the solid film is formed by blending the cresol novolac epoxy resin, the two bisphenol A epoxy resins, the hardener, and the filler material in a solvent carrier to form a homogenous liquid slurry, and evaporating excess solvent from the slurry at a temperature below a curing temperature of the solid film.

8. The method of claim 7, wherein the solid film has a curing temperature from about 120° C. to about 190° C.

9. The method of claim 1, further comprising preparing additional solid films of the B-stage uncured epoxy resin.

10. The method of claim 9, further comprising transporting the additional solid films, wherein at least one of the additional solid films is interposed between first and second release liners to prevent it from contacting other additional solid films.

11. The method of claim 1, wherein the three layer assembly is cooled to ambient temperature.

12. The method of claim 1, wherein the solid film does not comprise a solvent.

13. The method of claim 1, further comprising heating the three layer assembly to fully cure the sold film.

* * * * *